July 11, 1961 J. C. SIMS, JR 2,992,416

PULSE CONTROL SYSTEM

Filed Jan. 9, 1957 2 Sheets-Sheet 1

INVENTOR
John C. Sims, Jr.

BY Charles C. English
AGENT

July 11, 1961 J. C. SIMS, JR 2,992,416

PULSE CONTROL SYSTEM

Filed Jan. 9, 1957 2 Sheets-Sheet 2

INVENTOR
John C. Sims, Jr.

BY Charles C. English
AGENT

United States Patent Office 2,992,416
Patented July 11, 1961

2,992,416
PULSE CONTROL SYSTEM

John C. Sims, Jr., Springhouse, Pa., assignor to Sperry Rand Corporation, New York, N.Y., a corporation of Delaware Filed Jan. 9, 1957, Ser. No. 633,227
14 Claims. (Cl. 340—174)

Figure 1:
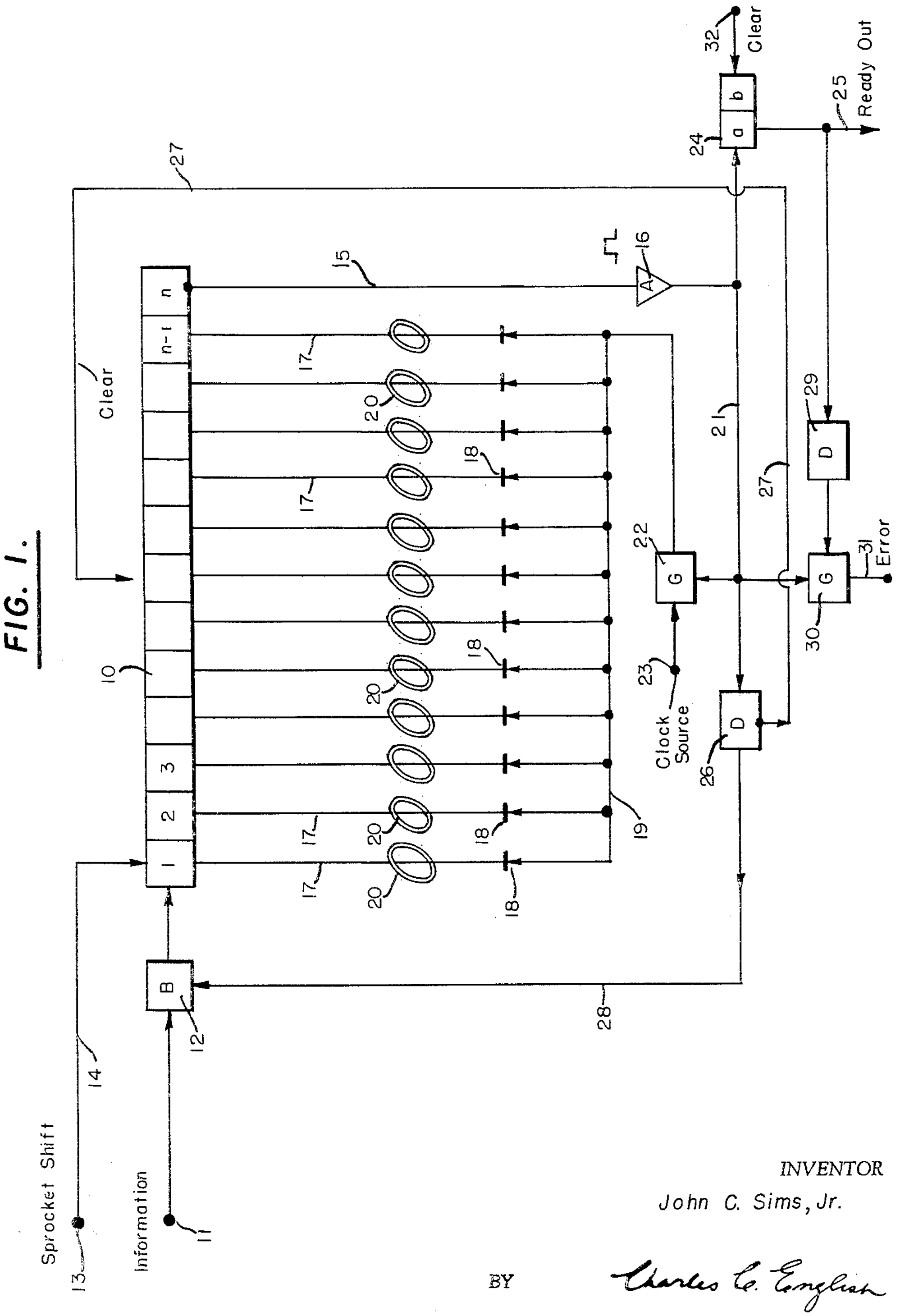

The present invention relates to improved pulse control systems such as may be employed in computer applications; and is particularly concerned with systems acting as serial-to-parallel converters, as pulse group synchronizers, and as code changers.

In the operation of various computers, particularly of the digital type, pulse groups are ordinarily provided for representing various digital numbers. Such pulse groups may be derived from memory structures, or as the result of calculations in particular portions of the computer device; and it is often required that the pulse group be modified somewhat in order to permit utilization of the pulse group in a subsequent operation. Certain such required modifications are as follows: Under some circumstances, the pulse group may take the form of a serial train of information, although a subsequent operation requires that the pulse train be transferred as a parallel group; and as a result, some form of serial-to-parallel converter is necessary. In addition, a requirement of synchronization often arises when the pulse groups are derived from multichannel magnetic tapes, since although plural pulse groups disposed in plural such tapes may originally have been synchronized with one another, such pulse groups may become unsynchronized at the time of reading the information, due to mechanical skew in the tape. Such problems of skew and their attendant effects are described with greater particularity in my prior copending application Serial No. 563,585, filed February 6, 1956, now Patent No. 2,937,366, for: "Pulse Group Synchronizer."

In addition, the requirements of pulse group synchronization are often coupled with requirements of serial-to-parallel conversion; and in such an event, unsynchronized trains of serial pulses appearing in plural channels on a magnetic tape may be required to be resynchronized, and thereafter converted from series to parallel pulse groups before further operations may occur. It will further be appreciated that when plural channel tapes of the types described are employed, code conversions may often be necessary, in that a five-channel code may, for example, be recorded in six channels on the tape. When this latter situation is present, structures are necessary which are adapted to effect pulse group synchronization, serial-to-parallel conversion to the pulse groups, and code changes during said conversion.

The structures to be described are particularly adapted to perform any one or more of the foregoing modifying functions; and as will become apparent from the subsequent description, the present invention may be utilized to effect pulse group synchronization and/or serial-to-parallel conversion, and/or code changes.

It is accordingly an object of the present invention to provide improved pulse control circuits, particularly adapted for use in high speed computer devices.

A further object of the present invention resides in the provision of control circuits adapted to interconnect pluralities of independent computers thereby to effect integrated computer systems.

Still another object of the present invention resides in the provision of an improved serial-to-parallel code converter.

A further object of the present invention resides in the provision of a pulse group synchronizer; and particularly resides in the provision of a control system adapted to receive plural groups of unsynchronized serial signals and to produce a synchronized parallel output.

Another object of the present invention resides in the provision of an improved pulse control system adapted to permit code changes.

A still further object of the present invention resides in the provision of pulse control circuits which are relatively simple in structure, relatively inexpensive to provide, and which can be made in fairly small sizes.

In providing for the foregoing objects and advantages, the present invention contemplates the provision of a basic pulse control circuit comprising a shifting register or a similar plural stage storage structure. Serial pulse groups may, as will be described, be coupled to an input of such a plural stage storage device; and the several pulses of this input serial train may be shifted in sequence through the plural stage storage device or register whereby information signals, representing for instance binary zeroes and binary ones, can be stored in the several stages of the said register.

In providing for this shifting function, sprocket pulses are utilized; and in accordance with a particular form of the present invention, such sprocket pulses can be derived from the serial information itself, whereby the system is self-sprocketing in nature. Such a self-sprocketing system is described in detail in prior copending application Serial No. 600,752 of J. P. Eckert, J. C. Sims, Jr., and H. F. Welsh, filed July 30, 1956, for: "Phase Modulated Pulse Recording Systems." Since the present invention does not relate primarily to such self-sprocketing arrangements, a detailed description of such self-sprocketing will not be included herein; but the said prior copending application of Eckert, Sims and Welsh is incorporated herein by reference to illustrate one form of sprocketing system which can be employed.

In the alternative, however, it will be appreciated from the subsequent description that the sprocket pulses may be derived from a clock generator, which produces regularly spaced clock pulses; and such a sprocketing system may be readily employed so long as the pulses or no-pulses representative of information signals, appear respectively during substantially regularly spaced time intervals.

A train of serial information, stored in the several stages of a plural stage register in the manner described above, may thereafter be transferred as a parallel output from the several individual stages of the register to a further memory comprising, as will be described, a memory core array; and in accordance with a particular feature of the present invention, control means are provided in association with the aforementioned register for detecting completion of an information shift into the register, and for thereafter effecting the said parallel transfer out of the register. In accordance with a further feature of the present invention, pulse control systems generally of the type described can be associated respectively with plural serial information trains, such as may appear for instance in a multichannel magnetic tape; and when this latter form of the invention is employed, the aforementioned input registers and auxiliary memory serve to synchronize the said plural input trains; serve to effect a serial-to-parallel conversion of the information in those trains; and moreover, permit code changes to be effected quite simply by appropriate choice of the write-in and read-out dimensions associated with the auxiliary memory array.

Figure 2:
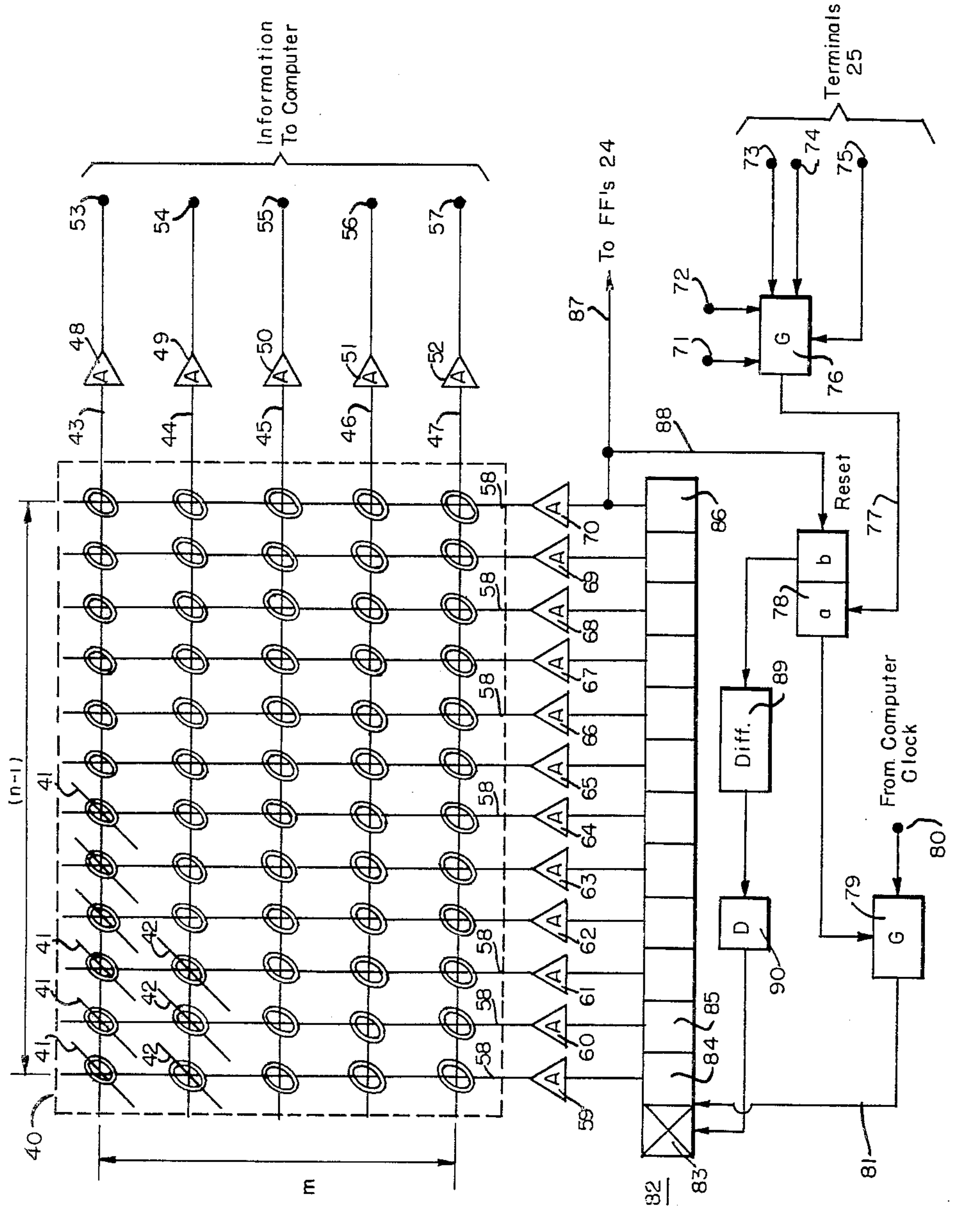

The foregoing objects, advantages, construction and operation of the present invention will become more readily apparent from the following description and accompanying drawings, in which:

FIGURE 1 illustrates one form of pulse control circuit constructed in accordance with a particular embodiment of the present invention and adapted to effect a serial-to-parallel conversion of an input pulse train; and FIGURE 2 is a partial schematic diagram of an improved pulse control system constructed in accordance with the present invention and adapted to effect serial-to-parallel and code conversions, as well as synchronization of plural information trains.

Referring now to FIGURE 1, it will be seen that, in accordance with the present invention, an improved pulse control system adapted to provide a fast parallel read-out of serial information, may comprise an input shifting register 10 having a plurality of stages 1, 2, 3, . . . *n*. The number of stages *n* comprising input register 10, is normally selected in accordance with the number of possible information pulses comprising an input pulse group; and as a practical matter, the number of such possible input pulses is *n*—1, whereby input register 10 includes a stage adapted to store each possible input pulse, plus one additional stage which is provided for control purposes, as will be described.

A train of serial information may be applied to input terminal 11, and the said information may thereafter be coupled via an input buffer 12 to the input of shifting register 10 comprising, in the particular example shown, the input of stage 1. The input train of information which is so applied to input terminal 11 can be derived, of course, from a magnetic tape, from other forms of memory structures, or from the output of a logical circuit in the same or in a different computing device. A source of sprocket pulses 13 is also provided, and the said sprocket pulses may be coupled via a sprocket shift line 14 to input register 10. These sprocket pulses are normally timed to occur shortly after the occurrence of each possible information pulse in the input train applied to terminal 11 whereby the sprocket pulses cooperate wtih the shifting register 10 to store each possible information pulse in one of the register stages 1 through *n*—1 inclusive.

As will become apparent subsequently, the first position of the register 10, designated stage 1, contains a "1" or a "sentinel" pulse prior to receipt of an information train at terminal 11 whereby the aforementioned shifting of information through the register 10 also serves to shift the said sentinel pulse from stage 1 toward stage *n*; and upon completion of an information train at terminal 11, the possible pulses of that information train will be stored in stages 1 through *n*—1 inclusive while the aforementioned sentinel pulse will have been shifted into stage *n*. The shift of the sentinel pulse into stage *n* indicates that the register 10 has been filled with possible pulses from the information train applied to terminal 11; and the said sentinel pulse may thereafter be coupled from an output of stage *n* via a line 15 and thence via an amplifier 16 thereby to perform a control function, as will be described.

Each of the several register stages 1 through *n* includes an output terminal, and the output terminals are coupled via lines 17 and thence via rectifiers such as germanium diodes 18, to a common transfer bus 19; and each of the lines 17 threads a corresponding core 20, preferably exhibiting a substantially rectangular hysteresis loop whereby the several cores 20 comprise an auxiliary memory taking the form of a core array. In normal operation, the several rectifiers 18 are non-conductive whereby outputs from the plural register stages 1 through *n*—1 are not coupled via the several drive lines 17 to the cores 20. However, upon occurrence of a pulse on line 15 (indicating that register 10 has been filled with information), the said sentinel pulse is passed via amplifier 16 to a control line 21 whereby the said pulse serves to momentarily open a gate 22. This opening of gate 22 permits a clock or power pulse to be emitted from a source 23 via the said gate 22 to transfer bus 19; and the pulse so applied to transfer bus 19 causes each of the rectifiers 18 to become conducting simultaneously thereby to effect a rapid parallel transfer of the information pulses in register stages 1 through *n*—1 via the several transfer lines 17 to the array of cores 20. As a result of this operation, therefore, the serial information originally appearing at terminal 11 has been converted to a parallel output, and the said parallel output is rapidly transferred from the several stages of the input register 10 to an auxiliary memory comprising cores 20. The lines 17 are thus input lines to a core memory system, the read-out and output lines for which have been omitted for purposes of simplifying the illustration. The core memory per se does not form part of this invention and the read-out and output lines for such a memory can be arranged in any manner now well known to the art.

The output of amplifier 16, which serves to control the aforementioned gate 22 to effect this parallel transfer, is also coupled to the *a* input side of a flip-flop 24 whereby the said flip-flop 24 provides an output signal on a line 25 thereby to indicate to subsequent circuits in the computer that the transfer of information has been effected whereby utilization of that information may be had by a read-out of the cores 20. In addition, the pulse appearing on line 21 is coupled via a first portion of a delay line 26 to a clear line 27 whereby the register 10 is cleared of information after a short delay necessary to permit transfer of information to the cores 20. After a further delay in delay line 26, the pulse on line 21 is coupled via a further line 28 to the aforementioned input buffer 12 thereby to reinsert a sentinel pulse in stage 1 of register 10. In short, the transfer of a sentinel pulse into stage *n* of register 10 effects a parallel transfer of information from the register to an auxiliary memory, signals subsequent circuits that this transfer has been effected, clears the register, and reinserts a further sentinel pulse in the first stage of the register 10 preparatory to receipt of still another information train.

As mentioned previously, one of the functions of the pulse coupled via amplifier 16 is to shift flip-flop 24 into its *a* output condition thereby to provide a ready signal at terminal 25. This particular *a* output of flip-flop 24 also passes through a further delay element 29 to the input of a gate 30, and the delay 29 is chosen to be sufficiently long to prevent the gate 30 from opening until the signal on line 21 has subsided. Thus, in normal operation, no output appears at output terminal 31 of gate 30. After the information has been read from the several cores 20 by the computing or other utilization circuit, these further circuits are adapted to provide a clear reset signal at a terminal 32 whereby flip-flop 24 is reset to its *b* output condition. If, however, input information appearing at terminal 11 should cause register 10 to become full before a clear signal appears at terminal 32 (and before the computer may make use of this further information), then the output appearing on line 21 will be coupled via the still open gate 30 to the terminal 31 thereby indicating that an error has occurred.

It will be appreciated that the arrangement thus described in reference to FIGURE 1 serves to provide serial-to-parallel conversion in a most efficient manner. It will be further appreciated that the overall arrangement described in reference to FIGURE 1 can serve as a buffer store between two unsynchronized systems. For example, it can serve to operate between a slow speed tape reader feeding information into line 11 and a high speed computing system reading information from cores 20; and provides for intermediate storage of information and transfer of that information between the said slow speed and high speed systems. Plural control systems generally of the type described in FIGURE 1 can, moreover, be associated with one another as well as with certain other components to act as an input synchronizer serving to realign information in plural channels which may have become misaligned due to tape skew or the like. This latter form of system is described in greater detail in FIGURE 2.

Thus, referring to FIGURE 2, it will be seen that an improved pulse control system in accordance with this further embodiment of the present invention may comprise an array 40 of magnetic cores, which array can be disposed in two or more dimensions. In the particular embodiment of FIGURE 2, the array has one dimension $(n-1)$ and a second dimension $m$, wherein $n-1$ corresponds to the number of information storage stages in a particular shifting register, for instance of the type shown in FIGURE 1, and the dimension $m$ corresponds to the number of shifting registers associated with a similar number $m$ of input pulse trains. It will be appreciated that in practice the $m$ shifting registers and $m$ pulse trains can be derived from a multichannel tape having, for instance, $m$ parallel channels.

The overall circuit shown in FIGURE 2 is adapted to cooperate with shifting registers and pulse transfer control networks generally of the type already described in reference to FIGURE 1; and this has been illustrated diagrammatically in FIGURE 2 by showing a plurality of drive lines 41 associated with the uppermost row of cores, it being understood that these drive lines 41 take generally the configuration of drive lines 17 associated with shifting register 10 of FIGURE 1. Similarly, a second row of cores can be associated with further drive lines 42, and these drive lines will be coupled to the outputs of the plural stages in another shifting register similar to 10. By the same token, each of the other $m$ rows of cores in the array 40 will normally have drive lines coupled from the outputs of further shifting registers, but these further drive lines have not been illustrated in order to avoid undue complexity.

In the particular example shown in FIGURE 2, the dimension $n-1$ is twelve, corresponding to assumed words of information twelve bits in length, which words would be stored in a given input register similar to register 10; and similarly, the $m$ dimension of array 40 is five in number, corresponding for instance to five distinct channels on a magnetic tape. The array of cores shown in FIGURE 2 is threaded in its $m$ dimension by a plurality of read-out lines 43 through 47 inclusive, and these read-out lines are in turn coupled via amplifiers 48 through 52 inclusive, to a plurality of output terminals 53 through 57 inclusive, whereby information may be coupled in parallel via the said terminals 53 through 57 from the array 40 to a computer circuit. Similarly, the array is threaded along its $n-1$ dimension with a plurality of sensing lines 58, which selectively derive drive from amplifiers 59 through 70 in a manner which will be described. The sensing lines 58 are, of course, employed to impose a magnetomotive force selectively upon the various cores associated with a given sensing line, thereby to read the information stored in those cores; and in the particular example shown in FIGURE 2, this readout is destructive in nature.

The operation of the several rows of cores associated with drive lines 41, etc., respectively, corresponds to that already described in reference to FIGURE 1; and it will be understood that, in the operation of this portion of the circuit, a serial train of information derived from a given channel of a multichannel tape is applied to and shifted through a shifting register until a sentinel pulse in that shifting register is shifted into control position. It will be recalled that this shifting of the sentinel pulse into the control position effects a parallel transfer of the serial information to a plurality of cores; and such a plurality of cores associated with a given shifting register are, as mentioned, illustrated by a given row of cores such as that associated with drive lines 41. This transfer operation is further accompanied by a control of flip-flop 24 (FIGURE 1) thereby to provide an output signal at terminal 25; and in accordance with the embodiment of FIGURE 2, the several terminals corresponding to terminal 25 (FIGURE 1) are coupled to five distinct inputs 71 through 75 of a coincidence gate 76. In short, gate 76 will not produce an output until all of the shifting registers, associated respectively with the $m$ dimension of cores, complete their transfer of information to their associated row of cores in the array 40. By reason of this particular consideration, therefore, no read-out occurs from the array 40 until all information is transferred from the plural input channels to the said array 40; and accordingly, possible errors due to mechanical skew or non-synchronization of pulses at their original input, are completely obviated.

When all information has ben transferred from the several input shifting registers to the plural rows of cores in array 40, coincident signals will be applied from the outputs of flip-flops similar to 24 to each of the input terminals 71 through 75 of gate 76, whereby said gate 76 produces an output on line 77 which sets a flip-flop 78 to its $a$ output producing condition. The $a$ output from flip-flop 78 is in turn coupled to an input of gate 79 whereby a clock generator 80 couples regularly occurring pulses via the said gate 79 to a shift line 81. Shift line 81 is coupled to the shift terminal of a further control shifting register 82 which is similar in construction and operation to that already described in reference to register 10.

In particular, register 82 has a total of $n$ stages, and the first stage 83 of the said register 82 normally contains a "1" or sentinel pulse therein. Once shift pulses are coupled via line 81 to the shift terminal of register 82 (indicating that information has been transferred into array 40 from all of the input registers), the said sentinel pulse, which was originally in initial stage 83 of register 82, is shifted in sequence through subsequent stages 84, 85, etc. This shift of the sentinel pulse into each subsequent register stage 84, 85, etc., applies drive in sequence via amplifiers 59, 60, 61, etc., to the various sensing lines 58, thereby to effect a destructive read-out, in parallel, of the several cores comprising a column of cores associated with a given sensing line 58. This operation continues in sequence, whereby groups of parallel pulses appear at terminals 53 through 57 in sequence, as the sentinel pulse shifts in register 82 from position 84 to the last stage 86 of the register.

Once the sentinel pulse in register 82 reaches register stage 86, thereby to couple drive via amplifier 70 to the last column of cores in array 40, a pulse is also coupled via line 87 to the several clear terminals 32 of flip-flops 24 (see FIGURE 1) thereby to reset those several flip-flops, whereby the control functions already described can occur. In addition, the shift of a sentinel pulse into register stage 86 couples a signal via line 88 to the $b$ input side of flip-flop 78 thereby to reset flip-flop 78. The transition of flip-flop 78 from its $a$ to its $b$ output state causes an output to be coupled via differentiator 89 and delay element 90 to the input of register stage 83 in register 82, whereby a further sentinel pulse is inserted into register 82 thereby to permit the read-out cycle to be repeated. By reason of the foregoing operation, therefore, several serial input trains which need not be synchronized, can be synchronized, converted from serial to parallel representation, and thereafter read out for further computations.

It will be appreciated, of course, that the array of cores comprising array 40 is merely illustrative, and both edges of the said array can assume other configurations. This latter consideration may in fact be of advantage in changing the code of input signals, or in permitting a different number of channels to be used in the recording system than are used in the parallel relationship of pulses in the computer code. By way of example, it may be noted that information expressed in a five-channel code could, for instance, be recorded in six channels on a magnetic tape. In such an event, the read-in connections to the core array 40 could have the dimensions 6 x 10, while the readout dimensions could be 5 x 12; and this choice of differing input and output dimensions would result in a code change during the read-out operation from array 40.

Moreover, it will be appreciated that rather than providing read-out under the control of a single line, such as 58, plural sensing lines can be employed, thereby to effect selective coincident current read-out from any core or column of cores; and for that matter, the sequence in which individual cores are read can be arbitrary or can follow any predetermined pattern rather than the successive column read-out already described.

Still further variations will be suggested to those skilled in the art, and certain of these variations have already been discussed; it must therefore be emphasized that the foregoing description is meant to be illustrative only and should not be considered limitative of the present invention. All such modifications and variations as are in accord with the principles described are meant to fall within the scope of the appended claims.

Having thus described my invention, I claim:

1. In combination, a plurality of plural stage shift registers each having a sentinel signal in a first stage thereof, means feeding unsynchronized trains of serial pulse signals to the inputs of said shift registers thereby to store said serial pulse signals in the plural stages of said shift registers and to advance said sentinel signals to last stages of said shift registers, memory means comprising an array of magnetic cores capable of assuming bistable states of magnetic remanence, said cores being arranged in a plurality of parallel core groups, means selectively responsive to the presence of said sentinel signals in said last stages of said shift registers for transferring the signals from each of said shift register stages to one of said cores respectively, and means for thereafter reading simultaneously the signals in successive ones of said plurality of parallel core groups during successive regularly spaced time intervals.

2. In combination, a plural stage shifting register having a sentinel signal in a first preselected stage thereof, means applying a serial train of information signals to an input of said register, means shifting said register subsequent to occurrence of each signal in said train thereby to effect a successive shift of said information signals and of said sentinel signal along the stages of said register whereby said shifting sentinel signal is always located in a stage of said register in advance of the register stages containing said information signals, means responsive to a shift of said sentinel signal into a second preselected stage of said register for effecting a simultaneous parallel read-out of the information signals located in the stages of said register preceding said second preselected stage, and means responsive to said shift of said sentinel signal into said second preselected stage for re-inserting a further sentinel signal into said first preselected stage subsequent to said parallel read-out.

3. The combination of claim 2 including a plurality of read-out lines coupled to said plural stages respectively, a comomn bus interconnecting said lines, said means for effecting said simultaneous read-out comprising means selectively applying a pulse to said common bus.

4. The combination of claim 3 including a plurality of magnetic cores capable of assuming bistable states of magnetic remanence, said cores linking said plurality of read-out lines respectively, whereby the information signals in said register are transferred to said magnetic cores in response to application of a pulse to said common bus.

5. The combination of claim 4 wherein each of said read-out lines includes a rectifier in series therewith.

6. In combination, a plural stage shifting register having a plurality of information storage stages and also having at least one control stage separate and distinct from said information storage stages, said control stage normally having no signal therein, means applying successive input signals to a first stage of said register, means for shifting said register thereby to store said successive input signals in different ones of said plurality of information storage stages of said register respectively, a memory device, a normally inactive transfer network coupling said plurality of information storage stages of said register to the said memory device, and means comprising a signal control circuit coupled to said separate and distinct register control stage and responsive to shift of a signal into said register control stage during operation of said shifting means for activating said transfer network thereby to effect a transfer of signals from the plural information storage stages of said register to said memory device.

7. The combination of claim 6 wherein said memory device comprises a magnetic core array having cores capable of assuming bistable states of magnetic remanence.

8. In combination, a plurality of plural stage storage registers, a magnetic core matrix having a plurality of cores capable of assuming bistable states of magnetic remanence arranged in plural rows and columns, a plurality of normally inactive transfer networks coupling the plural stages of each of said registers to a selected distinct plurality of said cores, means feeding successive input signals to the inputs of each of said registers, means shifting each of said registers thereby to store said input signals in the plural stages of said plurality of registers, control means coupled to each of said registers and responsive to occurrence of a signal in a preselected stage of its associated register for activating one of said transfer networks thereby to transfer the signals in a given register to a given distinct plurality of said cores, and means responsive to activation of all said transfer networks for effecting read-out of said core matrix.

9. In combination, a plurality of plural stage storage registers, a magnetic core matrix having a plurality of cores capable of assuming bistable states of magnetic remanence arranged in plural rows and columns, a plurality of normally inactive transfer networks coupling the plural stages of each of said registers to a selected row of said cores, means feeding successive input signals to the inputs of each of said registers, means shifting each of said registers thereby to store said input signals in the plural stages of said plurality of registers, control means coupled to each of said registers and responsive to occurrence of a signal in a preselected stage of its associated register for activating one of said transfer networks thereby to transfer the signals in a given register to a given row of said cores, and means responsive to activation of all said transfer networks for effecting read-out of said core matrix, said last-named means comprising a further plural stage shifting register having a control pulse therein, a plurality of drive lines coupled to the plural stages of said further register and linking said plural columns respectively, and means for selectively shifting said control pulse through successive stages of said further register thereby to energize said plurality of drive lines in sequence.

10. The combination of claim 9 including means responsive to shift of said control pulse into a preselected stage of said further register for inserting another control pulse into a prior stage of said further register.

11. In combination a magnetic core matrix comprising a plurality of magnetic cores capable of assuming bistable states of magnetic remanence, a plurality of normally inactive write lines linking groups of said cores, a plurality of read lines linking groups of said cores, a plurality of normally inactive sensing lines linking groups of said cores, a plurality of plural stage shifting registers each of which has the plural stage outputs thereof coupled respectively to selected ones of said write lines, means coupling serial signals to the inputs of each of said registers, means shifting each of said registers thereby to store said serial signals in the plural stages of said registers, means coupled to each register for selectively activating all the selected write lines coupled to the plural stages of that register thereby to effect a parallel transfer of the signals in said register to a selected group of said cores, and normally inactive signal generating means responsive to completion of signal transfer from all said registers for applying activating signals to said plurality of sensing lines thereby to effect a read-out of plural different groups of said cores.

12. The combination of claim 11 wherein said signal generating means includes means for applying said activating signals to said plurality of sensing lines in a predetermined sequence thereby to effect a preselected sequential read-out of plural different groups of said cores.

13. The combination of claim 11 wherein the plurality of cores in a core group linked by each of said sensing lines are different in number from said plurality of registers whereby the read-out of said core groups effects a code conversion.

14. In combination, a plural stage shifting register having a sentinel signal normally stored in one stage thereof, means applying a train of information signals to an input of said register, means for shifting said register thereby to shift said sentinel signal out of said one stage and to effect a successive shift of said information signals and of said sentinel signal along the stages of said register whereby said information signals and said sentinel signal are distributed into different stages of said register during successive operation of said shifting means, means responsive to the shift of said sentinel signal into a preselected stage of said register for effecting a simultaneous read-out of the information signals in said register, and means responsive to said shift of said sentinel signal into said preselected stage for reinserting a further sentinel signal into said one register stage subsequent to said information signal read-out.

References Cited in the file of this patent

UNITED STATES PATENTS

| | | |
|---|---|---|
| 2,403,561 | Smith | July 9, 1946 |
| 2,740,106 | Phelps | Mar. 27, 1956 |
| 2,787,416 | Hansen | Apr. 2, 1957 |
| 2,800,596 | Bolie | July 23, 1957 |
| 2,904,626 | Rajchman et al. | Sept. 15, 1959 |
| 2,931,014 | Buchholz et al. | Mar. 29, 1960 |

OTHER REFERENCES

"Static Magnetic Memory—Its Applications to Computers and Controlling Systems," by An Wang, "Proc. of Assoc. of Computing Machinery," May 2–3, 1952, pp. 207–212.

"Magnetic Core Circuits for Digital Data—Processing Systems" by Loev et al. Proceedings of IRE, vol. 44, issue 2, pp. 154–162, February 1956.